United States Patent [19]

Tomita et al.

[11] Patent Number: 5,748,668
[45] Date of Patent: May 5, 1998

[54] SPREAD SPECTRUM METHOD FOR TRANSMITTING AN INFORMATION SIGNAL AS A RADIO SIGNAL AT A HIGH SPEED

[75] Inventors: Hideho Tomita; Masahiro Ooki; Yukitsuna Furuya, all of Tokyo, Japan

[73] Assignee: NEC Corporation, Tokyo, Japan

[21] Appl. No.: 798,874

[22] Filed: Feb. 11, 1997

Related U.S. Application Data

[62] Division of Ser. No. 325,701, Oct. 19, 1994, Pat. No. 5,625,639.

[30] Foreign Application Priority Data

Oct. 22, 1993 [JP] Japan .................. 5-265109

[51] Int. Cl.⁶ .................................................. H04K 1/00
[52] U.S. Cl. ............................................. 375/200; 375/206
[58] Field of Search ................................ 375/200, 206, 375/208, 295, 279–281, 298, 308; 364/717; 327/164

[56] References Cited

U.S. PATENT DOCUMENTS

| | | | |
|---|---|---|---|
| 4,308,617 | 12/1981 | German et al. | 375/208 |
| 4,930,140 | 5/1990 | Cripps et al. | 375/208 |
| 5,144,641 | 9/1992 | Akazawa et al. | 375/208 |
| 5,291,515 | 3/1994 | Uchida et al. | 375/200 |
| 5,420,850 | 5/1995 | Umeda et al. | 370/204 |
| 5,467,367 | 11/1995 | Izumi et al. | 375/206 |
| 5,583,884 | 12/1996 | Maruyama et al. | 375/207 |
| 5,625,639 | 4/1997 | Tomita et al. | 375/200 |

*Primary Examiner*—Tesfaldet Bocure
*Attorney, Agent, or Firm*—Ostrolenk, Faber, Gerb & Soffen, LLP

[57] ABSTRACT

In a spread spectrum device including a serial to parallel converter (14) for converting a serial information signal (10) into a parallel signal of n bits, where n represents an integer not smaller than two, an information modulator (20) carries out information modulation on m bits among the n bits of the parallel signal and produces a modulated information signal, where m represents a positive integer smaller than n. A selective spreading code producing circuit (21, 22) has spectrum spreading codes which are equal in number to $2^{(n-m)}$ and are different from one another. The selective spreading code producing circuit selectively produces, as a selected spreading code, one of the spectrum spreading codes that is specified by remaining (n–m) bits among the n bits of the parallel signal. A spectrum spreading circuit (23) carries out spectrum spreading on the modulated information signal on the basis of the selected spreading code and produces a spectrum spread signal (13). The spectrum spread signal may be transmitted by a radio portion (18) as a radio information signal (11).

10 Claims, 5 Drawing Sheets

SPREAD SPECTRUM METHOD FOR TRANSMITTING AN INFORMATION SIGNAL AS A RADIO SIGNAL AT A HIGH SPEED

This is a Division of application Ser. No. 08/325,701, filed Oct. 19, 1994 issued as U.S. Pat. No. 5,625,639 issued on Apr. 29, 1997.

BACKGROUND OF THE INVENTION

This invention relates to a spread spectrum method and device for spectrum spreading a serial information signal into a spectrum spread signal. This invention relates also to a radio information transmitting method and device for transmitting the serial information signal as a radio information signal by the use of the spread spectrum method and device.

A radio information transmitting device which makes use of a spread spectrum method, is used, for example, in a private branch radio communication network, such as a radio LAN (Local Area Network) and in radio communication by a weak radio wave of a low intensity. Such a spread spectrum method is disclosed in, for example, Japanese Unexamined Patent Publications Nos. 2-299334 (namely, 299334/1990) and 3-238943 (238943/1991). The spread spectrum method is classified into a direct sequence spread spectrum (DS-SS) method, a frequency hopping (FH) method, and a combination of the DS-SS method and the FH method. Among those, the DS-SS method is most often used.

A conventional spread spectrum method which will later be described, is in accordance with the DS method and makes it impossible to transmit a serial information signal as a radio information signal at a high speed. This is because the serial information signal is transmitted as the radio information signal with all bits of the serial information signal subjected to spectrum spreading on the basis of a fixed spreading code which is determined independently of the bits of the information signal.

SUMMARY OF THE INVENTION

It is therefore an object of this invention to provide a spread spectrum method which makes it possible to transmit a serial information signal as a radio information signal at a high speed.

It is a specific object of this invention to provide a spread spectrum device which makes it possible to transmit a serial information signal as a radio information signal at a high speed.

It is a further object of this invention to provide a radio information transmitting method which can transmit a serial information signal as a radio information signal at a high speed.

It is a different object of this invention to provide a radio information transmitting device which can transmit a serial information signal as a radio information signal at a high speed.

Other objects of this invention will become clear as the description proceeds.

According to an aspect of this invention, there is provided a method which is for spectrum spreading a serial information signal into a spectrum spread signal and which comprises the steps of: serial to parallel converting the serial information signal into a parallel signal of n bits, where n represents an integer not smaller than two; carrying out information modulation on m bits among the n bits of the parallel signal to produce a modulated information signal, where m represents a positive integer smaller than n; selectively producing, as a selected spreading code, one of spectrum spreading codes which are equal in number to $2^{(n-m)}$ and are different from one another, the above-mentioned one of spectrum spreading codes being specified by remaining (n−m) bits among the n bits of the parallel signal; and carrying out spectrum spreading on the modulated information signal on the basis of the selected spreading code to produce the spectrum spread signal.

According to another aspect of this invention, there is provided a method which is for spectrum spreading a serial information signal into a spectrum spread signal and which comprises the steps of: serial to parallel converting the serial information signal into a parallel signal of (i+q+u+v) bits, where each of i, q, u, and v represents a positive integer, i being equal to q; carrying out information modulation on i bits among the (i+q+u+v) bits of the parallel signal and on q bits among the (i+q+u+v) bits of the parallel signal to produce first and second modulated information signals, respectively; selectively producing, as a first selected spreading code, one of first spectrum spreading codes which are equal in number to $2^u$ and are different from one another, the above-mentioned one of the first spectrum spreading codes being specified by u bits of remaining (u+v) bits among the (i+q+u+v) bits of the parallel signal; selectively producing, as a second selected spreading code, one of second spectrum spreading codes which are equal in number to $2^v$ and are different from one another and from the first spectrum spreading codes, the above-mentioned one of the second spectrum spreading codes being specified by remaining v bits among the (i+q+u+v) bits of the parallel signal; carrying out spectrum spreading on the first modulated information signal on the basis of the first selected spreading code to produce a first spectrum spread signal; and carrying out spectrum spreading on the second modulated information signal on the basis of the second selected spreading code to produce a second spectrum spread signal. The first and the second spectrum spread signals are for use collectively as the spectrum spread signal.

According to a specific aspect of this invention, there is provided a spread spectrum device which is for spectrum spreading a serial information signal into a spectrum spread signal and which comprises: a serial to parallel converter for converting the serial information signal into a parallel signal of n bits, where n represents an integer not smaller than two; an information modulator connected to the serial to parallel converter for carrying out information modulation on m bits among the n bits of the parallel signal to produce a modulated information signal, where m represents a positive integer smaller than n; selective spreading code producing means having spectrum spreading codes which are equal in number to $2^{(n-m)}$ and are different from one another, the selective spreading code producing means being connected to the serial to parallel converter for selectively producing, as a selected spreading code, one of the spectrum spreading codes that is specified by remaining (n−m) bits among the n bits of the parallel signal; and spectrum spreading means connected to the information modulator and the selective spreading code producing means for carrying out spectrum spreading on the modulated information signal on the basis of the selected spreading code to produce the spectrum spread signal.

According to another specific aspect of this invention, there is provided a spread spectrum device which is for spectrum spreading a serial information signal into a spectrum spread signal and which comprises: a serial to parallel converter for converting the serial information signal into a parallel signal of (i+q+u+v) bits, where each of i, q, u, and v represents a positive integer, i being equal to q; an information modulator connected to the serial to parallel converter for carrying out information modulation on i bits among the (i+q+u+v) bits of the parallel signal and on q bits among the (i+q+u+v) bits of the parallel signal to produce first and second modulation information signals, respectively; first selecting spreading code producing means having first spectrum spreading codes which are equal in number to $2^u$ and are different from one another, the first selective spreading code producing means being connected to the serial to parallel converter for selectively producing, as a first selected spreading code, one of the first spectrum spreading codes that is specified by u bits of remaining (u+v) bits among the (i+q+u+v) bits of the parallel signal; second selective spreading code producing means having second spectrum spreading codes which are equal in number to $2^v$ and are different from one another and from the first spectrum spreading codes, the second selective spreading code producing means being connected to the serial to parallel converter for selectively producing, as a second selected spreading code, one of the second spectrum spreading codes that is specified by remaining v bits among the (i+q+u+v) bits of the parallel signal; first spectrum spreading means connected to the information modulator and the first selective spreading code producing means for carrying out spectrum spreading on the first modulated information signal on the basis of the first selected spreading code to produce a first spectrum spread signal; and second spectrum spreading means connected to the information modulator and the second selective spreading code producing means for carrying out spectrum spreading on the second modulated information signal on the basis of the second selected spreading code to produce a second spectrum spread signal. The first and the second spectrum spread signals are for use collectively as the spectrum spread signal.

According to a further aspect of this invention, there is provided a method which is for transmitting a serial information signal as a radio information signal and which comprises the steps of: serial to parallel converting the serial information signal into a parallel signal of n bits, where n represents an integer not smaller than two; carrying out information modulation on m bits among the n bits of the parallel signal to produce a modulated information signal, where m represents a positive integer smaller than n; selectively producing, as a selected spreading code, one of spectrum spreading codes which are equal in number to $2^{(n-m)}$ and are different from one another, the above-mentioned one of spectrum spreading codes being specified by remaining (n−m) bits among the n bits of the parallel signal; carrying out spectrum spreading on the modulated information signal on the basis of the selected spreading code to produce a spectrum spread signal; and transmitting the spectrum spread signal as the radio information signal.

According to a still further aspect of this invention, there is provided a method which is for transmitting a serial information signal as a radio information signal and which comprises the steps of: serial to parallel converting the serial information signal into a parallel signal of (i+q+u+v) bits, where each of i, q, u, and v represents a positive integer, i being equal to q; carrying out information modulation on i bits among the (i+q+u+v) bits of the parallel signal and on q bits among the (i+q+u+v) bits of the parallel signal to produce first and second modulated information signals, respectively; selectively producing, as a first selected spreading code, one of first spectrum spreading codes which are equal in number to $2^u$ and are different from one another, the above-mentioned one of the first spectrum spreading codes being specified by u bits of remaining (u+v) bits among the (i+q+u+v) bits of the parallel signal; selectively producing, as a second selected spreading code, one of second spectrum spreading codes which are equal in number to $2^v$ and are different from one another and from the first spectrum spreading codes, the above-mentioned one of the second spectrum spreading codes being specified by remaining v bits among the (i+q+u+v) bits of the parallel signal; carrying out spectrum spreading on the first modulated information signal on the basis of the first selected spreading code to produce a first spectrum spread signal; carrying out spectrum spreading on the second modulated information signal on the basis of the second selected spreading code to produce a second spectrum spread signal; and transmitting the first and the second spectrum spread signals as the radio information signal.

According to a different aspect of this invention, there is provided a radio information transmitting device which is for transmitting a serial information signal as a radio information signal and which comprises: a serial to parallel converter for converting the serial information signal into a parallel signal of n bits, where n represents an integer not smaller than two; an information modulator connected to the serial to parallel converter for carrying out information modulation on m bits among the n bits of the parallel signal to produce a modulated information signal, where m represents a positive integer smaller than n; selective spreading code producing means having spectrum spreading codes which are equal in number to $2^{(n-m)}$ and are different from one another, the selective spreading code producing means being connected to the serial to parallel converter for selectively producing, as a selected spreading code, one of the spectrum spreading codes that is specified by remaining (n−m) bits among the n bits of the parallel signal; spectrum spreading means connected to the information modulator and the selective spreading code producing means for carrying out spectrum spreading on the modulated information signal on the basis of the selected spreading code to produce a spectrum spread signal; and transmitting means connected to the spectrum spreading means for transmitting the spectrum spread signal as the radio information signal.

According to another different aspect of this invention, there is provided a radio information transmitting device which is for transmitting a serial information signal as a radio information signal and which comprises: a serial to parallel converter for converting the serial information signal into a parallel signal of (i+q+u+v) bits, where each of i, q, u, and v represents a positive integer, i being equal to q; an information modulator connected to the serial to parallel converter for carrying out information modulation on i bits among the (i+q+u+v) bits of the parallel signal and on q bits among the (i+q+u+v) bits of the parallel signal to produce first and second modulated information signals, respectively; first selective spreading code producing means having first spectrum spreading codes which are equal in number to $2^u$ and are different from one another, the first selective spreading code producing means being connected to the serial to parallel converter for selectively producing, as a first selected spreading code, one of the first spectrum spreading codes that is specified by u bits of remaining (u+v) bits among the (i+q+u+v) bits of the parallel signal; second selective spreading code producing means having second spectrum spreading codes which are equal in number to $2^v$ and are different from one another and from the first spectrum spreading codes, the second selective spreading code producing means being connected to the serial to parallel converter for selectively producing, as a second selected spreading code, one of the second spectrum spreading codes that is specified by remaining v bits among the (i+q+u+v) bits of the parallel signal; first spectrum spreading means connected to the information modulator and the first selective spreading code producing means for carrying out spectrum spreading on the first modulated information signal on the basis of the first selected spreading code to produce a first spectrum spread signal; second spectrum spreading means connected to the information modulator and the second selective spreading code producing means for carrying out spectrum spreading on the second modulated information signal on the basis of the second selected spreading code to produce a second spectrum spread signal; and transmitting means connected to the first and the second spectrum spreading means for transmitting the first and the second spectrum spread signals as the radio information signal.

DESCRIPTION OF THE PREFERRED EMBODIMENTS

Figure 1:
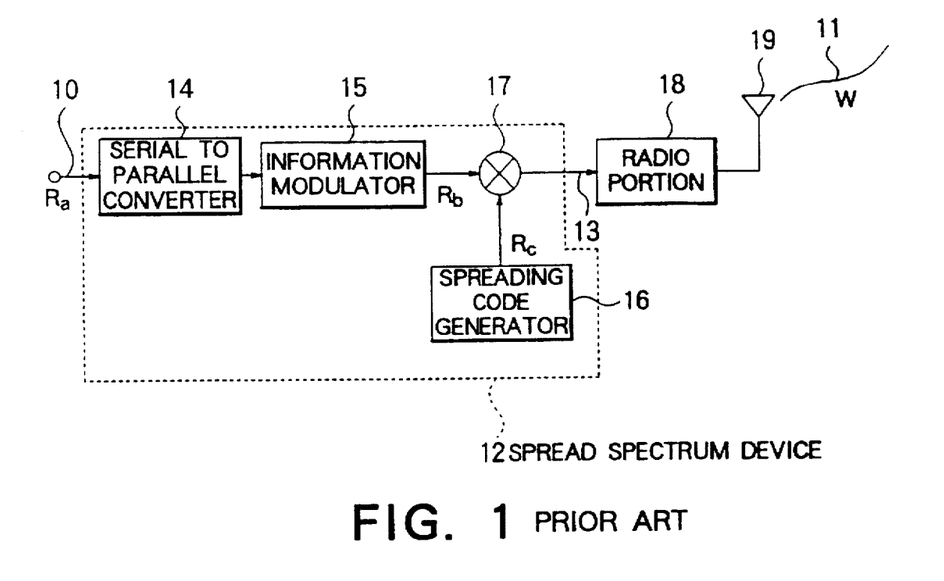
FIG. 1 is a block diagram of a radio information transmitting device for use in carrying out a conventional spread spectrum method.

Referring to FIG. 1, description will first be made as regards a radio information transmitting device for use in carrying out a conventional spread spectrum method which is equivalent to that described in the preamble of the instant specification. The radio information transmitting device is for transmitting a serial information signal 10 as a radio information signal 11 and comprises a spread spectrum device 12 to carry out the conventional spread spectrum method.

The spread spectrum device 12 is for spectrum spreading the serial information signal 10 into a spectrum spread signal 13 and comprises a serial to parallel converter 14 which converts the serial information signal 10 into a parallel signal of n bits, where n represents an integer not smaller than two. Connected to the serial to parallel converter 14, an information modulator 15 carries out information modulation on the n bits of the parallel signal to produce a modulated information signal. A spreading code generator 16 generates a fixed spreading code which is determined independently of the bits of the information signal 10.

Connected to the information modulator 15 and the spreading code generator 16, a multiplier 17 multiplies the modulated information signal and the fixed spreading code together to produce a multiplied signal as the spectrum spread signal 13. Thus, the multiplier 17 serves as a spectrum spreading circuit which carries out spectrum spreading on the modulated information signal on the basis of the fixed spreading code to produce the spectrum spread signal 13.

The radio information transmitting device further comprises a radio portion 18 which transmits the spectrum spread signal 13 as the radio information signal 11 through an antenna 19. Thus, a combination of the radio portion 18 and the antenna 19 is operable as a transmitting circuit which transmits the spectrum spread signal 13 as the radio information signal 11.

Let the serial information signal 10 be represented by a(t), the modulated information signal, by b(t), a spreading code signal generated by the spreading code generator 16, by c(t), and the spectrum spread signal 13, by s(t). In this event, the spectrum spread signal s(t) is given by:

$$s(t)=b(t)\times c(t).$$

The serial information signal a(t) has a data rate Ra (bit/s). The modulated information signal b(t) has a symbol rate Rb (symbol/s). The spreading code signal c(t) has a chip rate Rc (chip/s). The spectrum spread signal s(t) has a bandwidth W (Hz). The spectrum spreading ratio or factor is depicted at K. The information modulator 15 has a multilevel index or factor m (m=n in the illustrated example). In this event, the following relationship holds:

$$W=2Rc;\ K=Rc/Rb;\ \text{and}\ Ra=mRb=nRb. \quad (1)$$

From Equations (1), the data rate Ra of the serial information signal 10 is given by:

$$Ra=nW/2K. \quad (2)$$

In a private branch radio communication network, such as a radio LAN, there is a stronger demand for an increase in the data rate of the serial information signal 10 in order to match with a cable LAN.

Considering Equation (2), three approaches can be proposed in order to increase the data rate of the information signal 10.

(a) to widen the bandwidth W, (b) to reduce the spectrum spreading ratio K, and (c) to increase the multilevel index or factor m of the information modulation (to increase m or n).

Generally, the bandwidth W and the spectrum spreading ratio K are restricted. In the radio LAN of an ISM (Industry, Science, and Medical) band in Japan, the bandwidth W should not exceed 26 MHz while the spreading ratio K must not be smaller than 10. Thus, the approaches (a) and (b) can not be practically used. One possible approach is therefore to increase the number m of multilevels of the information modulation as described in (c). As a conventional information modulation system of a DS type, use has generally been made of a quadrature phase shift keying (QPSK) system (m=2). To further increase the number m of multilevels, use may be made of a 8PSK system (m=3), a 16PSK system (m=4), or a 16 quadrature amplitude modulation (QAM) system (m=4). From Equation (2), the data rate Ra of the serial information signal 10 is given by:

$$Ra=W/K \text{ (QPSK)}; Ra=1.5 \ W/K \text{ (8PSK)}; Ra=2 \ W/K \text{ (16PSK or 16QAM)}. \qquad (3)$$

That is, the data rate in the 8PSK system is 1.5 times as high as the data rate in the QPSK system. The data rate in the 16PSK or the 16QAM system is twice as high as the data rate in the QPSK system.

When the data rate is increased as mentioned above, various problems arise. At first, in the 8PSK or the 16PSK system, an interval or distance between signal points is small as compared with the QPSK system. Specifically, a phase difference between the signal points is equal to $\pi/4$, $\pi/8$, and $\pi/16$ in the QPSK, the 8PSK, and the 16PSK or the 16QAM systems, respectively. Under the condition where a signal-to-noise ratio S/N is identical, a bit error rate is deteriorated in proportion to the magnitude of the multilevel index m. Taking the above into consideration, error correction must be carried out in the PSK systems of an increased number of levels. As a result, the data rate of the information signal is inevitably reduced due to a coding ratio of error correction.

Secondly, in the private branch radio communication network, such as a radio LAN, it is required to cover a service area within a range between 10 cm and 100 m. If an NTT (Nippon Telegraph and Telephone Corporation in Japan) model is used as a propagation model in a room, a dynamic range is approximately equal to 60 dB to satisfy the above-mentioned requirement. In the 16QAM system using amplitude information in addition to phase information, it is necessary to secure a linearity in a radio portion of the radio information receiving device over a wide range of about 60 dB in order to avoid deterioration of the error rate. This results in an increased cost of the radio portion of the radio information receiving device.

This invention provides a radio information transmitting device of the direct sequence spectrum spreading (DS-SS) system, which device is capable of increasing the data rate at a relatively low cost.

Figure 2:
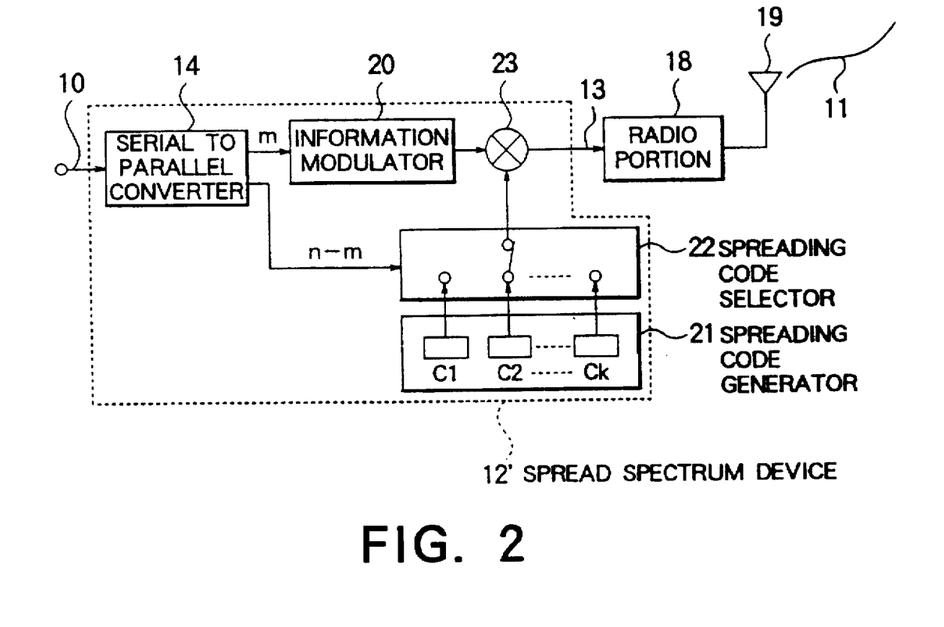
FIG. 2 is a block diagram of a radio information transmitting device for use in carrying out a spread spectrum method according to a first embodiment of this invention.

Turning to FIG. 2, description will proceed to a radio information transmitting device for use in carrying out a spread spectrum method according to a first embodiment of this invention. The radio information transmitting device comprises similar parts designated by like reference numerals. The radio information transmitting device comprises another spread spectrum device 12' which is similar to the spread spectrum device 12 of FIG. 1 except for the following.

An information modulator 20 is connected to the serial to parallel converter 14 to carry out information modulation on m bits among the n bits of the parallel signal to produce a modulated information signal, where m represents a positive integer smaller than n. A spreading code generator 21 generates spectrum spreading codes which are equal in number to $2^{(n-m)}$ and are different from one another. In the illustrated example, the spectrum spreading codes are depicted by C1, C2, ..... and Ck. Connected to the serial to parallel converter 14 and the spreading code generator 21, a spreading code selector 22 selects, as a selected spreading code, one of the spectrum spreading codes that is specified by remaining (n−m) bits among the n bits of the parallel signal.

Thus, a combination of the spreading code generator 21 and the spreading code selector 22 serves as a selective spreading code producing circuit having the spectrum spreading codes which are equal in number to $2^{(n-m)}$ and are different from one another. Connected to the serial to parallel converter 14, the selective spreading code producing circuit selectively produces, as the selected spreading code, one of the spectrum spreading codes that is specified by the remaining (n−m) bits among the n bits of the parallel signal.

Connected to the information modulator 20 and the spreading code selector 22, a multiplier 23 multiplies the modulated information signal and the selected spreading code together to produce a multiplied signal as the spectrum spread signal 13. Thus, the multiplier 23 serves as a spectrum spreading circuit which carries out spectrum spreading on the modulated information signal on the basis of the selected spreading code to produce the spectrum spread signal 13.

It will be assumed here that n is equal to 4 bits and that information modulation is carried out by the QPSK system (m=2 bits). At first, the serial information signal 10 is converted by the serial to parallel converter 14 into the parallel signal of 4 bits. Among those, two bits are supplied to the information modulator 20 and subjected to QPSK modulation to produce the modulated information signal. In response to the condition of the remaining two bits of the parallel signal, the spreading code selector 22 selects, as the selected spreading code Cs (s=1 to k=4), one of four spectrum spreading codes generated by the spreading code generator 21. The multiplier 21 multiplies the modulated information signal and the selected spreading code Cs to produce the spectrum spread signal 13. The spectrum spread signal 13 is transmitted through the radio portion 18 and the antenna 19.

It will be supposed like in the device of FIG. 1 that the data rate of the serial information signal 10 is represented by Ra; the symbol rate of the QPSK modulated information signal being represented by Rb; the chip rate of a spreading code signal representative of the selected spreading code Cs being represented by Rc; the bandwidth of the spectrum spread signal 13 being represented by W; the spectrum spreading ratio or factor being represented by K; and the multilevel index or factor of the information modulator 20 being represented by m. Herein, the following relationship holds:

$$W=2Rc; \ K=Rc/Rb; \text{ and } Ra=mRb+(n-m)Rb=nRb. \qquad (4)$$

Substituting n=4 and m=2 into Equations (4), the data rate is given by:

$$Ra=2W/K.$$

It will be understood from Equation (3) that, in a case where n=4 and m=2, the data rate Ra of the serial information signal 10 is increased to twice as compared with the prior art of FIG. 1, provided that the bandwidth W and the spectrum spreading ratio K are identical with those used in the prior art of FIG. 1. Thus, even when the information modulator 20 carries out the QPSK as the information modulation, the data rate can be substantially increased.

In the foregoing description, n is equal to 4. In order to further increase the data rate in the information modulation by the QPSK (m=2), n is selected to be equal to 6 (three times the prior art) or 8 (four times the prior art). Thus, it is possible to increase the data rate to n/2 times as high as that of the prior art by selecting a greater value of n. However, such a high data rate requires an increased number of the spectrum spreading codes as represented by $2^{(n-2)}$.

According to this invention, the data rate is substantially increased in the information modulation by the QPSK system. It is therefore possible to avoid deterioration of the bit error rate which is caused in the 16PSK system. In addition, it is unnecessary to secure the linearity in the radio portion of the radio information receiving device in the 16QAM system.

Figure 3:
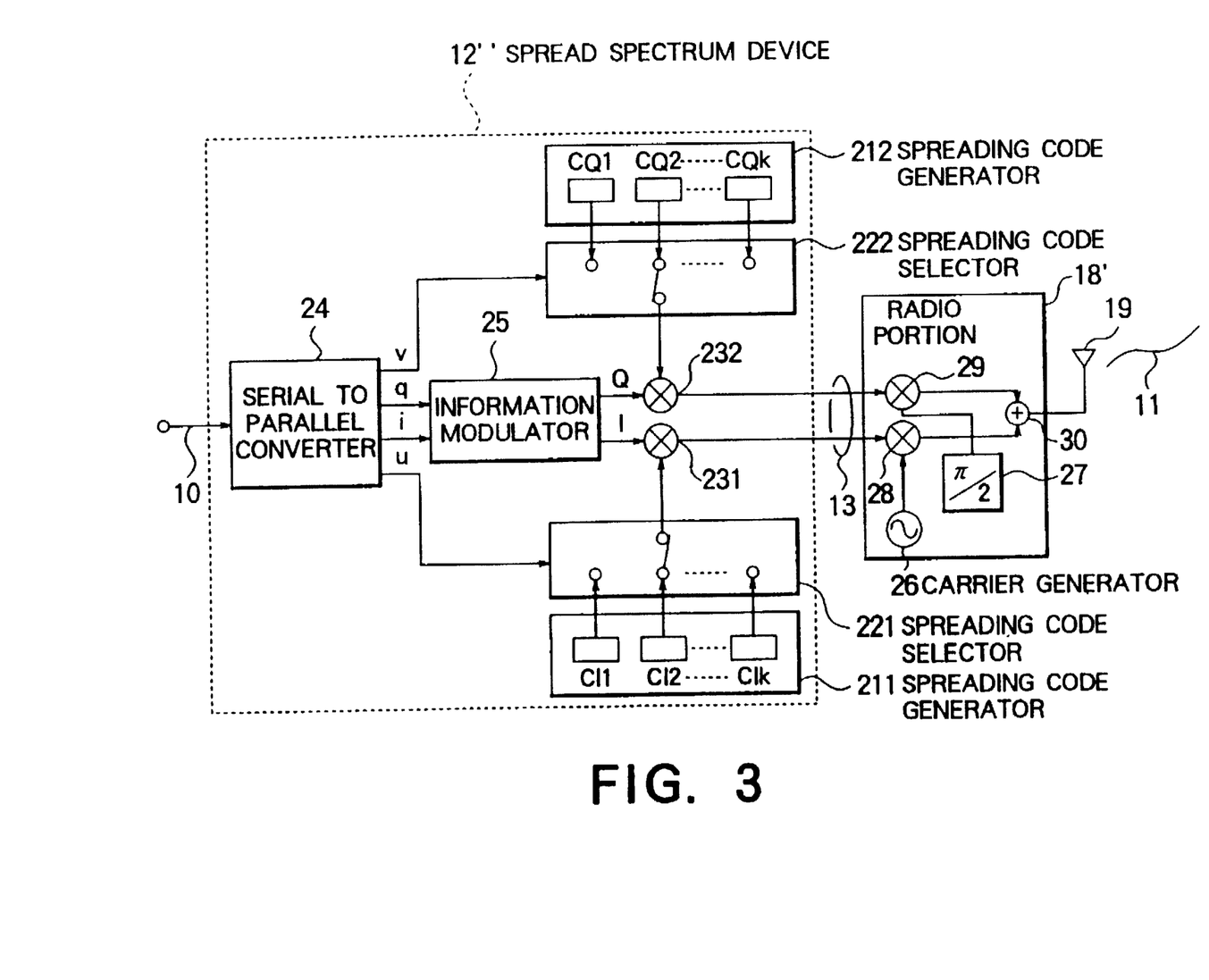
FIG. 3 is a block diagram of a radio information transmitting device for use in carrying out a spread spectrum method according to a second embodiment of this invention.

Turning to FIG. 3, description will proceed to a radio information transmitting device for use in carrying out a spread spectrum method according to a second embodiment of this invention. The radio information transmitting device comprises still another spread spectrum device 12".

In the spread spectrum device 12", a serial to parallel converter 24 converts the serial information signal 10 into a parallel signal of n=(i+q+u+v) bits, where each of i, q, u, and v represents a positive integer, i being equal to q (m=i+q). Connected to the serial to parallel converter 24, an information modulator 25 carries out information modulation on i bits among the (i+q+u+v) bits of the parallel signal and on q bits among the (i+q+u+v) bits of the parallel signal to produce first and second modulated information signals I and Q, respectively.

A first spreading code generator 211 generates first spectrum spreading codes which are equal in number to $2^u$ and are different from one another. In the illustrated example, the first spectrum spreading codes are labelled CI1, CI2, ..., and CIk. Connected to the serial to parallel converter 24 and the first spreading code generator 211, a first spreading code selector 221 selects, as a first selected spreading code, one of the first spectrum spreading codes that is specified by u bits of remaining (u+v) bits among the (i+q+u+v) bits of the parallel signal.

Thus, a combination of the first spreading code generator 211 and the first spreading code selector 221 serves as a first selective spreading code producing circuit having the first spectrum spreading codes which are equal in number to $2^u$ and are different from one another. Connected to the serial to parallel converter 24, the first selective spreading code producing circuit selectively produces, as the first selected spreading code, one of the first spectrum spreading codes that is specified by the u bits of remaining (u+v) bits among the (i+q+u+v) bits of the parallel signal.

A second spreading code generator 212 generates second spectrum spreading codes which are equal in number to $2^v$ and are different from one another and from the first spectrum spreading codes. In the illustrated example, the second spectrum spreading codes are labelled CQ1, CQ2, ..., and CQk. Connected to the serial to parallel converter 24 and the second spreading code generator 212, a second spreading code selector 222 selects, as a second selected spreading code, one of the second spectrum spreading codes that is specified by remaining v bits among the (i+q+u+v) bits of the parallel signal.

Thus, a combination of the second spreading code generator 212 and the second spreading code selector 222 serves as a second selective spreading code producing circuit having the second spectrum spreading codes which are equal in number to $2^v$ and are different from one another and from the first spectrum spreading codes. Connected to the serial to parallel converter 24, the second selective spreading code producing circuit selectively produces, as the second selected spreading code, one of the second spectrum spreading codes that is specified by the remaining v bits among the (i+q+u+v) bits of the parallel signal.

Connected to the information modulator 25 and the first spreading code generator 221, a first multiplier (which serves as a first spectrum spreading circuit) 231 carries out spectrum spreading on the first modulated information signal I on the basis of the first selected spreading code to produce a first spectrum spread signal. Connected to the information modulator 25 and the second spreading code generator 222, a second multiplier (which serves as a second spectrum spreading circuit) 232 carries out spectrum spreading on the second modulated information signal Q on the basis of the second selected spreading code to produce a second spectrum spread signal. The first and the second spectrum spread signals I and Q are for use collectively as the spectrum spread signal 13.

Connected to the first and the second multipliers (namely, the first and the second spectrum spreading circuits) 231 and 232, a radio portion (which serves as a transmitting circuit) 18' transmits the first and the second spectrum spread signals as the radio information signal 11 through the antenna 19.

The radio portion (namely, the transmitting circuit) 18' comprises a quadrature modulating circuit which comprises a carrier generator 26, a π/2 phase shifter or converter 27 (labelled π/2), multipliers 28 and 29, and an adder 30 and carries out quadrature modulation on the first and the second spectrum spread signals to produce a quadrature modulated signal as the radio information signal 11 through the antenna 19. The carrier generator 26 produces a radio carrier signal having a radio frequency. The π/2 phase shifter 27 shifts a phase of the radio carrier signal by π/2 to produce a shifted carrier signal. The multiplier 28 multiplies the first spectrum spread signal and the radio carrier signal to produce a first multiplied signal. The multiplier 29 multiplies the second spectrum spread signal and the shifted carrier signal to produce a second multiplied signal. The adder 30 adds the first and the second multiplied signals together to produce an added signal as the quadrature modulated signal.

It will be assumed here that n=6, i=q=1, and u=v=2. In other words, the information modulator 21 carries out information modulation of the QPSK (m=i+q=2). The first and the second spreading code generators 31 and 32 have first and the second spectrum spreading code sets, each of which includes four spectrum spreading codes (eight spectrum spreading codes in total). The data rate Ra of the serial information signal 10 is calculated from Equation (4) as follows:

$$Ra=3W/K.$$

Thus, the data rate is three times as high as that of the prior art of FIG. 1. If it is desired to further increase the data rate in this second embodiment, the value of n is selected to be equal to 8 (four times the prior art) or 10 (five times the prior art) in the information modulation of the QPSK, in the manner similar to the first embodiment of FIG. 2. Thus, it is possible to increase the data rate to n/2 times as high as that of the prior art by selecting a greater value of n. However, such a high data rate requires an increased number of the spectrum spreading codes as represented by ($2^u+2^v$) as described in conjunction with the first embodiment of FIG. 2.

In this second embodiment, the number of the spectrum spreading codes to be used is smaller than that required in the first embodiment of FIG. 2. It is assumed here that u is equal to v and that m (=i+q) is equal to 2. In this event, n (=u+v+m) is equal to (2u+2). That is, n=(2u+2)=2(u+1) or n/2=(u+1). The number ($2^u+2^v$) of the spectrum spreading codes in this second embodiment of FIG. 3 is therefore equal to ($2^u+2^u$)=$2^{(u+1)}$=$2^{n/2}$. On the other hand, the number of the spectrum spreading codes in the first embodiment of FIG. 2 is equal to $2^{(n-2)}$. For the information modulation of the QPSK, the numbers of the spectrum spreading codes in the second and the first embodiments of FIGS. 3 and 2 are shown in the following table with respect to the different values of n.

TABLE

| Value of n | 4 | 6 | 8 | 10 |
|---|---|---|---|---|
| Increase in Data Rate | 2 times | 3 times | 4 times | 5 times |
| Number of Spreading Codes (FIG. 3) | $2^2$ | $2^3$ | $2^4$ | $2^5$ |
| Number of Spreading Codes (FIG. 2) | $2^2$ | $2^4$ | $2^6$ | $2^8$ |

Figure 4:
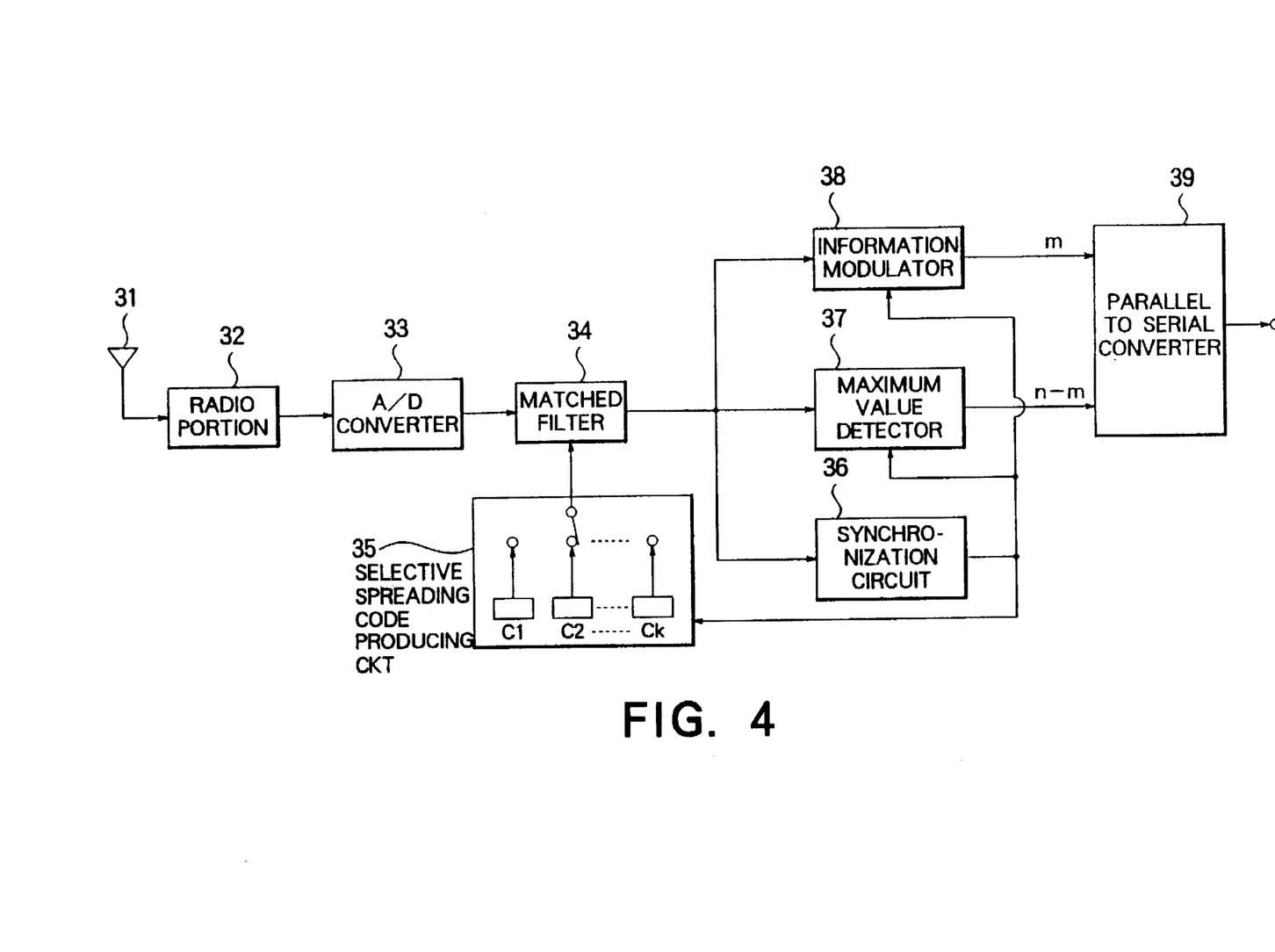
FIG. 4 is a block diagram of a radio information receiving device which is used as a counterpart of the radio information transmitting device illustrated in FIG. 2.

Turning to FIG. 4, a radio information receiving device is used as a counterpart of the radio information transmitting device of FIG. 2. The radio information receiving device comprises an antenna 31, a radio portion 32 including a quadrature demodulator, an A/D (analog-to-digital) converter 33, a matched filter 34, a selective spreading code producing circuit 35 for producing the spectrum spreading codes C1 to Ck used in the radio information transmitting device of FIG. 2, a synchronization circuit 36 for extracting from a received information signal a symbol timing of the radio information transmitting device of FIG. 2, a maximum value detector 37, an information demodulator 38, and a parallel to serial converter 39. The selective spreading code producing circuit 35 is similar in structure and in operation to the selective spreading code producing circuit 21 and 22 of FIG. 2.

Operation of the radio information receiving device will be described. In the following description, n is equal to 4 as described in conjunction with the first embodiment of FIG. 2. The radio information signal 11 (FIG. 2) is received as the received information signal by the antenna 31. The received information signal is supplied through the antenna 31 to the radio portion 32 and is subjected to quadrature demodulation to be produced as a demodulated information signal. The demodulated information signal is converted by the A/D converter 33 into a digital information signal. Then, the matched filter 34, which serves as a correlation detector, calculates correlation between the digital information signal and the spectrum spreading codes C1 to Ck supplied from the selective spreading code producing circuit 35 to produce four correlation values. The maximum value detector 37 detects the maximum value among the four correlation values to determine an estimated spreading code which is estimated to be the selected spreading code selected by the spreading code selector 22 in the radio information transmitting device of FIG. 2 for each symbol of the modulated information signal. Two bits corresponding to the estimated spreading code are decoded by the maximum value detector 37 into the (n−m) bits of the parallel signal produced by the serial to parallel converter 14 of the radio information transmitting device of FIG. 2.

On the other hand, as a result of demodulation carried out by the information demodulator 38 in correspondence to the maximum value of the four correlation values, the m bits of the parallel signal produced by the serial to parallel converter 14 of the radio information transmitting device of FIG. 2 are obtained. The parallel to serial converter 39 converts the m bits and the (n−m) bits into n bits of a serial information signal which is identical with the serial information signal 10 (FIG. 2). Herein, switching of the spectrum spreading codes in the selective spreading code producing circuit 35, detection of the maximum value in the maximum value detector 37, and demodulation in the information demodulator 38 are carried out in synchronism with the symbol timing extracted by the synchronization circuit 36.

Description will now proceed to the spectrum spreading codes used in this invention.

In the private branch radio communication network of, for example, the radio LAN, communication quality depends on a characteristic of resistance or tolerance to a multipath. Accordingly, this invention uses the spectrum spreading codes which do not cause deterioration of the error rate even in a multipath environment.

As described in conjunction with FIG. 4, the radio information receiving device includes the matched filter 34 as the correlation detector. If only inverse spreading signal information at a synchronization point of the symbol timing extracted by the synchronization circuit 36 is provided, the maximum value detector 37 and the information demodulator 38 in the radio information receiving device can carry out the maximum value detecting operation and the demodulating operation, respectively. Therefore, the spectrum spreading code Cs (where s is consecutively variable between 1 and k, both inclusive) used in this invention is required to satisfy the following conditions, taking the influence of the multipath into consideration.

Figure 5:
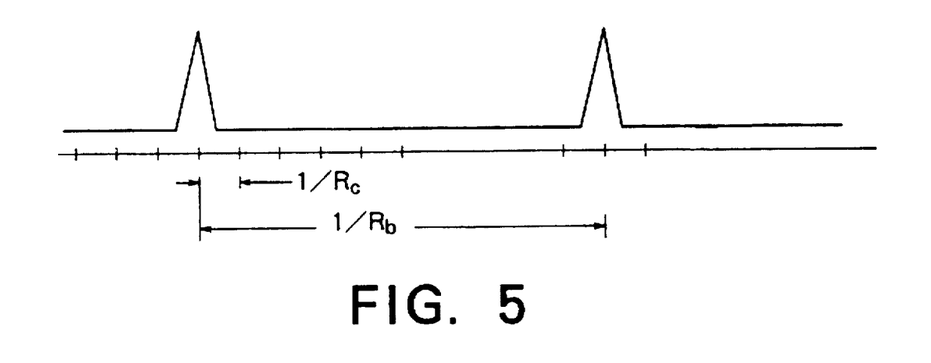
FIG. 5 is a view for use in describing operation of the radio information transmitting device illustrated in FIG. 2 and of the radio information receiving device illustrated in FIG. 4.

Condition (1):

Autocorrelation illustrated in FIG. 5 is represented by:

$$RCs(\tau) = 1/T0 \int_{-T0/2}^{+T0/2} Cs(t)Cs(t+\tau)dt$$

Figure 6:
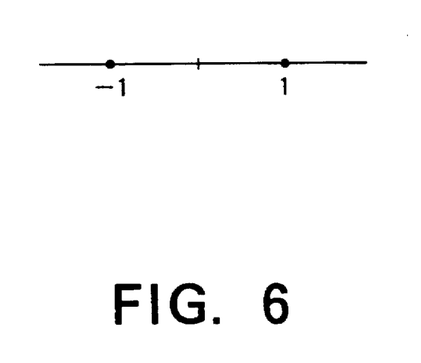
FIG. 6 is another view for use in describing operation of the radio information transmitting device illustrated in FIG. 2 and of the radio information receiving device illustrated in FIG. 4.

The autocorrelation is small except the synchronization points ($\tau=0$) as illustrated in FIG. 6.

Figure 7:
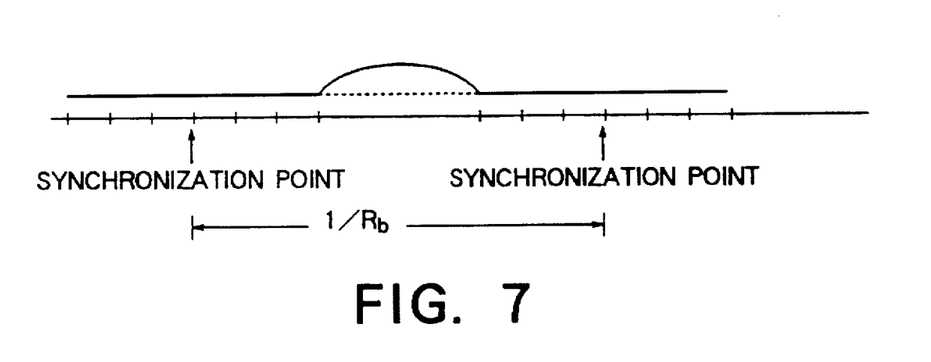
FIG. 7 is still another view for use in describing operation of the radio information transmitting device illustrated in FIG. 2 and of the radio information receiving device illustrated in FIG. 4.

Condition (2):

Cross-correlation illustrated in FIG. 7 is represented by:

$$RCsCs'(\tau) = 1/T0 \int_{-T0/2}^{+T0/2} Cs(t)Cs'(t+\tau)dt$$

Figure 8:
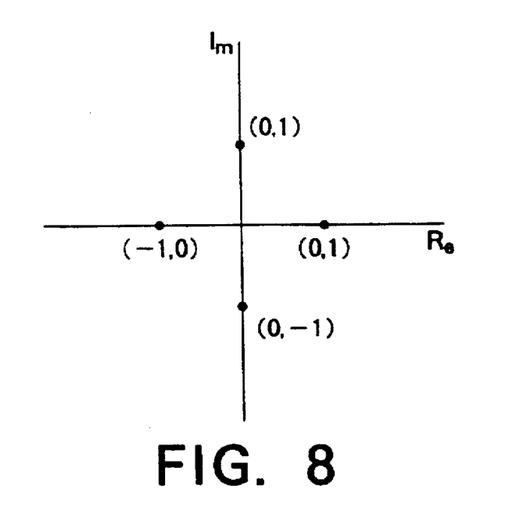
FIG. 8 is a further view for use in describing operation of the radio information transmitting device illustrated in FIG. 2 and of the radio information receiving device illustrated in FIG. 4.

The cross-correlation is small including the synchronization points ($\tau=0$). Alternatively, the cross-correlation is small at the synchronization points ($\tau=0$) and the proximity thereof as illustrated in FIG. 8 in case of a two-dimensional code. The cross-correlation in a remaining area is smaller than the peak value of autocorrelation at the synchronization points. It is noted here that the proximity of the synchronization points is such a range that sufficiently covers variation of delay (about 100 nanoseconds) in a room.

Condition (3):

The balance in polarity is kept. Specifically, in case of the one-dimensional code illustrated in FIG. 6, the total numbers of +1 and −1 are balanced.

In this invention, the spectrum spreading code Ci satisfying the conditions (1), (2), and (3) is a one-dimensional code or a two-dimensional code representing a complex number. When the spectrum spreading code Ci is the one-dimensional code, the multipliers 23, 231, and 232 of the radio information transmitting device of FIGS. 2 and 3 and the matched filter 34 of the radio information receiving device of FIG. 4 advantageously have a simple structure.

On the other hand, the cross-correlation between the spectrum spreading codes and the autocorrelation except at the synchronization points (τ=0) must be as small as possible in view of the characteristic of resistance to the multipath. For this purpose, the two-dimensional code (complex number) is superior than the one-dimensional code as the spectrum spreading code Ci satisfying the above-mentioned conditions. This is because, when the code length is depicted by k (determined by the spreading ratio K), the total number of the spectrum spreading codes possibly used in case of the one-dimensional code is equal to $2^k$ while the total number of the spectrum spreading codes possibly used in case of the two-dimensional code is not smaller than $2^{2k}$. However, when the two-dimensional code is used as the spectrum spreading code Ci, the multipliers 23, 231, and 232 of the radio information transmitting device of FIGS. 2 and 3 and the matched filter 34 of the radio information receiving device of FIG. 4 should carry out complex calculation. This inevitably requires a complicated structure.

In order to avoid the above-mentioned disadvantage, the spectrum spreading code Cs is given by Cs=a+jb according to this invention and (a, b) is restricted to four points (1, 0), (0, 1), (−1, 0), and (0, −1), as illustrated in FIG. 8. Specifically, the spectrum spreading code Cs is a code sequence selected from (1, j, −1, −j). When the spectrum spreading code is defined as mentioned above, multiplication between a given complex number A and the spectrum spreading code Cs is carried out in the following manner:

A×1 . . . untouched

A×j . . . rotation by −90° (I and Q replaced)

A×−1 . . . rotation by −180°

A×−j . . . rotation by −90° (I and Q replaced)

Thus, the multipliers 23, 231, and 232 of the radio information transmitting device of FIGS. 2 and 3 and the matched filter 34 of the radio information receiving device of FIG. 4 are not required to carry out the complex calculation. Therefore, the circuit structure can be simplified as in the case of the one-dimensional code.

It will be understood that this invention is not restricted to the information modulation by the QPSK. If an increase in data rate is a top priority even with an increased cost, this invention is adapted to the 8PSK or the 16PSK with an increased number of levels. In this case, a remarkable increase can be achieved which is never attained by the prior art.

Figure 9:
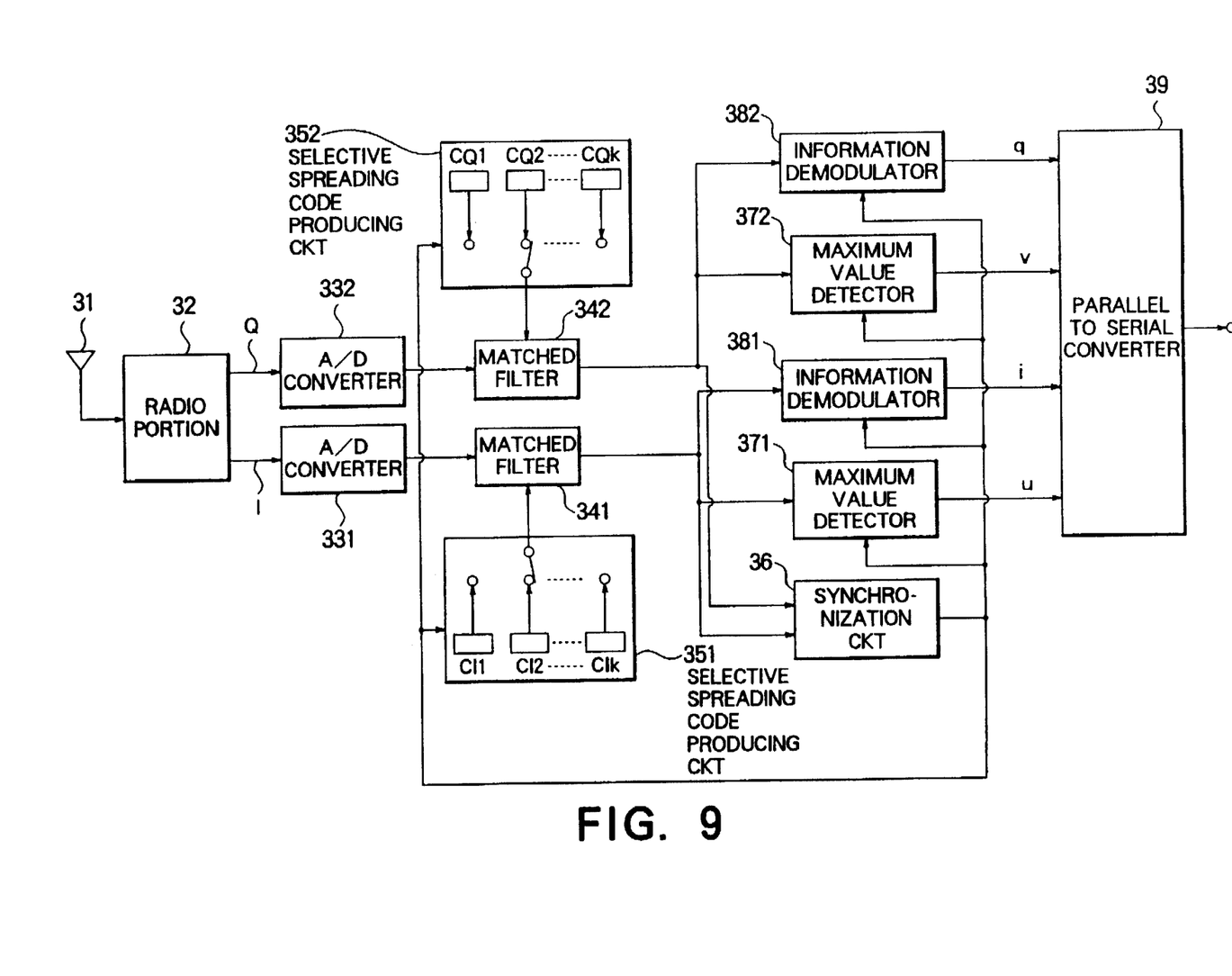
FIG. 9 is a block diagram of a radio information receiving device which is used as a counterpart of the radio information transmitting device illustrated in FIG. 3.

Turning to FIG. 9, a radio information receiving device is used as a counterpart of the radio information transmitting device of FIG. 3 and is similar to the radio information receiving device of FIG. 4 except for the following. The radio portion 2 including the quadrature demodulator 32 produces the first and the second spectrum spread signals I and Q and delivers the first and the second spectrum spread signals I and Q through first and second A/D converters 331 and 332 to first and second matched filters 341 and 342. Each of the first and the second A/D converters 331 and 332 is similar in structure and in operation to the A/D converter 33 of FIG. 4. First and second selective spreading code producing circuits 351 and 352 produce first spectrum spreading codes CIl to CIk and second spectrum spreading codes CQl to CQk which are used in the radio information transmitting device of FIG. 3 and which are delivered to the first and the second matched filters 341 and 342. The first selective spreading code producing circuit 351 is similar in structure and in operation to the first selective spreading code producing circuit 211 and 221 of FIG. 3. The second selective spreading code producing circuit 352 is similar in structure and in operation to the second selective spreading code producing circuit 212 and 222 of FIG. 3. Each of the first and the second matched filters 341 and 342 is similar in structure and in operation to the matched filter 34. Output signals of the first and the second matched filters 341 and 342 are delivered to first and second maximum value detectors 371 and 372, respectively, and are delivered to first and second information demodulators 381 and 382, respectively. Each of the first and the second maximum value detectors 371 and 372 is similar in structure and in operation to the maximum value detector 37 of FIG. 4. Each of the first and the second information demodulators 381 and 382 is similar in structure and in operation to the information demodulator 38 of FIG. 4.

Supplied with the output signals of the first and the second matched filters 341 and 342, the synchronization circuit 36 controls the first and the second matched filters 341 and 342, the first and the second maximum value detectors 371 and 372, and the first and the second information demodulators 381 and 382 in the manner similar to the synchronization circuit 36 of FIG. 4. As a result, the first maximum value detector 371 recovers the u bits of the parallel signal produced by the serial to parallel converter 24 of FIG. 3. Likewise, the second maximum value detector 372 recovers the v bits of the parallel signal produced by the serial to parallel converter 24 of FIG. 3. The first information demodulator 381 recovers the i bits of the parallel signal produced by the serial to parallel converter 24 of FIG. 3. Likewise, the second information demodulator 382 recovers the q bits of the parallel signal produced by the serial to parallel converter 24 of FIG. 3. Outputs of the first and the second maximum value detectors 371 and 372 and the first and the second information demodulators 381 and 382 are delivered to the parallel to serial converter 39 to be converted into a serial information signal identical with the serial information signal 10 of FIG. 2.

What is claimed is:

1. A method of spectrum spreading a serial information signal into a spectrum spread signal, said method comprising the steps of:

serial to parallel converting said serial information signal into a parallel signal of (i+q+u+v) bits, where each of i, q, u, and v represents a positive integer, i being equal to q;

carrying out information modulation on i bits among the (i+q+u+v) bits of said parallel signal and on q bits among the (i+q+u+v) bits of said parallel signal to produce first and second modulated information signals, respectively;

selectively producing, as a first selected spreading code, one of first spectrum spreading codes which are equal in number to $2^u$ and are different from one another, said one of the first spectrum spreading codes being specified by u bits of remaining (u+v) bits among the (i+q+u+v) bits of said parallel signal;

selectively producing, as a second selected spreading code, one of second spectrum spreading codes which are equal in number to $2^v$ and are different from one another and from said first spectrum spreading codes, said one of the second spectrum spreading codes being specified by remaining v bits among the (i+q+u+v) bits of said parallel signal;

carrying out spectrum spreading on said first modulated information signal on the basis of said first selected spreading code to produce a first spectrum spread signal; and carrying out spectrum spreading on said second modulated information signal on the basis of said second selected spreading code to produce a second spectrum spread signal;

said first and said second spectrum spread signals being for use collectively as said spectrum spread signal.

2. A method as claimed in claim 1, wherein:

said first-mentioned selectively producing step comprises the steps of:
   generating said first spectrum spreading codes; and
   selecting, as said first selected spreading code, said one of the first spectrum spreading codes that is specified by said u bits;

said last-mentioned selectively producing step comprising the steps of:
   generating said second spectrum spreading codes; and
   selecting, as said second selected spreading code, said one of the second spectrum spreading codes that is specified by said remaining v bits.

3. A spread spectrum device for spectrum spreading a serial information signal into a spectrum spread signal, said spread spectrum device comprising:

a serial to parallel converter for converting said serial information signal into a parallel signal of (i+q+u+v) bits, where each of i, q, u, and v represents a positive integer, i being equal to q;

an information modulator connected to said serial to parallel converter for carrying out information modulation on i bits among the (i+q+u+v) bits of said parallel signal and on q bits among the (i+q+u+v) bits of said parallel signal to produce first and second modulated information signals, respectively;

first selecting spreading code producing means having first spectrum spreading codes which are equal in number to $2^u$ and are different from one another, said first selective spreading code producing means being connected to said serial to parallel converter for selectively producing, as a first selected spreading code, one of said first spectrum spreading codes that is specified by u bits of remaining (u+v) bits among the (i+q+u+v) bits of said parallel signal;

second selective spreading code producing means having second spectrum spreading codes which are equal in number to $2^v$ and are different from one another and from said first spectrum spreading codes, said second selective spreading code producing means being connected to said serial to parallel converter for selectively producing, as a second selected spreading code, one of said second spectrum spreading codes that is specified by remaining v bits among the (i+q+u+v) bits of said parallel signal;

first spectrum spreading means connected to said information modulator and said first selective spreading code producing means for carrying out spectrum spreading on said first modulated information signal on the basis of said first selected spreading code to produce a first spectrum spread signal; and second spectrum spreading means connected to said information modulator and said second selective spreading code producing means for carrying out spectrum spreading on said second modulated information signal on the basis of said second selected spreading code to produce a second spectrum spread signal;

said first and said second spectrum spread signals being for use collectively as said spectrum spread signal.

4. A spread spectrum device as claimed in claim 3, wherein:

said first selective spreading code producing means comprises:
      a first spreading code generator for generating said first spectrum spreading codes; and
      a first spreading code selector connected to said serial to parallel converter and said first spreading code generator for selecting, as said first selected spreading code, said one of the first spectrum spreading codes that is specified by said u buts;

said second selective spreading code producing means comprising:
      a second spreading code generator for generating said second spectrum spreading codes; and
      a second spreading code selector connected to said serial to parallel converter and said second spreading code generator for selecting, as said second selected spreading code, said one of the second spectrum spreading codes that is specified by said remaining v bits.

5. A method of transmitting a serial information signal as a radio information signal, said method comprising the steps of:

serial to parallel converting the serial information signal into a parallel signal of (i+q+u+v) bits, where each of i, q, u, and v represents a positive integer, i being equal to q;

carrying out information modulation on i bits among the (i+q+u+v) bits of said parallel signal and on q bits among the (i+q+u+v) bits of said parallel signal to produce first and second modulated information signals, respectively;

selectively producing, as a first selected spreading code, one of first spectrum spreading codes which are equal in number to $2^u$ and are different from one another, said one of the first spectrum spreading codes being specified by u bits of remaining (u+v) bits among the (i+q+u+v) bits of said parallel signal;

selectively producing, as a second selected spreading code, one of second spectrum spreading codes which are equal in number to $2^v$ and are different from one another and from said first spectrum spreading codes, said one of the second spectrum spreading codes being specified by remaining v bits among the (i+q+u+v) bits of said parallel signal;

carrying out spectrum spreading on said first modulated information signal on the basis of said first selected spreading code to produce a first spectrum spread signal;

carrying out spectrum spreading on said second modulated information signal on the basis of said second selected spreading code to produce a second spectrum spread signal; and transmitting said first and said second spectrum spread signals as said radio information signal.

6. A method as claimed in claim 5, wherein:

said first-mentioned selectively producing step comprises the steps of:
   generating said first spectrum spreading codes; and
   selecting, as said first selected spreading code, said one of the first spectrum spreading codes that is specified by said u bits;

said last-mentioned selectively producing step comprising the steps of:
   generating said second spectrum spreading codes; and
   selecting, as said second selected spreading code, said one of the second spectrum spreading codes that is specified by said remaining v bits.

7. A method as claimed in claim 5, wherein said transmitting step comprises the step of carrying out quadrature modulation on said first and said second spectrum spread signals to produce a quadrature modulated signal as said radio information signal.

8. A radio information transmitting device for transmitting a serial information signal as a radio information signal, said radio information transmitting device comprising:

a serial to parallel converter for converting said serial information signal into a parallel signal of (i+q+u+v) bits, where each of i, q, u, and v represents a positive integer, i being equal to q;

an information modulator connected to said serial to parallel converter for carrying out information modulation on i bits among the (i+q+u+v) bits of said parallel signal and on q bits among the (i+q+u+v) bits of said parallel signal to produce first and second modulated information signals, respectively;

first selective spreading code producing means having first spectrum spreading codes which are equal in number to $2^u$ and are different from one another, said first selective spreading code producing means being connected to said serial to parallel converter for selectively producing, as a first selected spreading code, one of said first spectrum spreading codes that is specified by u bits of remaining (u+v) bits among the (i+q+u+v) bits of said parallel signal;

second selective spreading code producing means having second spectrum spreading codes which are equal in number to $2^v$ and are different from one another and from said first spectrum spreading codes, said second selective spreading code producing means being connected to said serial to parallel converter for selectively producing, as a second selected spreading code, one of said second spectrum spreading codes that is specified by remaining v bits among the (i+q+u+v) bits of said parallel signal;

first spectrum spreading means connected to said information modulator and said first selective spreading code producing means for carrying out spectrum spreading on said first modulated information signal on the basis of said first selected spreading code to produce a first spectrum spread signal;

second spectrum spreading means connected to said information modulator and said second selective spreading code producing means for carrying out spectrum spreading on said second modulated information signal on the basis of said second selected spreading code to produce a second spectrum spread signal; and transmitting means connected to said first and said second spectrum spreading means for transmitting said first and said second spectrum spread signals as said radio information signal.

9. A radio information transmitting device as claimed in claim 8, wherein:

said first selective spreading code producing means comprises:

a first spreading code generator for generating said first spectrum spreading codes; and a first spreading code selector connected to said serial to parallel converter and said first spreading code generator for selecting, as said first selected spreading code, said one of the first spectrum spreading codes that is specified by said u bits;

said second selective spreading code producing means comprising:

a second spreading code generator for generating said second spectrum spreading codes; and a second spreading code selector connected to said serial to parallel converter and said second spreading code generator for selecting, as said second selected spreading code, said one of the second spectrum spreading codes that is specified by said remaining v bits.

10. A radio information transmitting device as claimed in claim 8, wherein said transmitting means comprises quadrature modulating means connected to said first and said second spectrum spreading means for carrying out quadrature modulation on said first and said second spectrum spread signals to produce a quadrature modulated signal as said radio information signal.

* * * * *